US009341781B2

(12) United States Patent
Diddams et al.

(10) Patent No.: US 9,341,781 B2
(45) Date of Patent: May 17, 2016

(54) LASER MACHINING AND MECHANICAL CONTROL OF OPTICAL MICRORESONATORS

(71) Applicants: Scott Diddams, Louisville, CO (US); Scott Papp, Boulder, CO (US); Pascal Del'Haye, Boulder, CO (US)

(72) Inventors: Scott Diddams, Louisville, CO (US); Scott Papp, Boulder, CO (US); Pascal Del'Haye, Boulder, CO (US)

(73) Assignee: The United States of America, as represented by the Secretary of Commerce The National Institute of Standards & Technology, Washington, DC (US)

( * ) Notice: Subject to any disclaimer, the term of this patent is extended or adjusted under 35 U.S.C. 154(b) by 223 days.

(21) Appl. No.: 14/022,097

(22) Filed: Sep. 9, 2013

(65) Prior Publication Data
US 2014/0090425 A1   Apr. 3, 2014

Related U.S. Application Data

(60) Provisional application No. 61/698,741, filed on Sep. 10, 2012.

(51) Int. Cl.
| | |
|---|---|
| B23K 26/02 | (2014.01) |
| B23K 26/12 | (2014.01) |
| G02B 6/28 | (2006.01) |
| G02B 6/293 | (2006.01) |
| B23K 26/03 | (2006.01) |

(Continued)

(52) U.S. Cl.
CPC ............ G02B 6/2804 (2013.01); B23K 26/032 (2013.01); B23K 26/0613 (2013.01); B23K 26/0665 (2013.01); B23K 26/142 (2015.10); B23K 26/38 (2013.01); G02B 6/29341 (2013.01); B23K 2203/54 (2015.10)

(58) Field of Classification Search
CPC ............ B23K 26/00–26/0066; B23K 26/0084; G02B 6/2804
USPC .......................................... 219/121.6–121.86
See application file for complete search history.

(56) References Cited

U.S. PATENT DOCUMENTS

| | | | | |
|---|---|---|---|---|
| 4,170,726 | A | * | 10/1979 | Okuda ..................... 219/121.69 |
| 4,338,114 | A | * | 7/1982 | Brockway et al. ................. 65/28 |
| 4,731,254 | A | * | 3/1988 | Heineken et al. ............. 427/554 |

(Continued)

OTHER PUBLICATIONS

Fabrication of High-Q Microresonators using Femtosecond Laser Micromachining, Kazunari Tada et al., May 6-11, 2012, Conference on Lasers and Electro-Optics (CLEO), 2012 , pp. 1-2.

Primary Examiner — Sang Y Paik
(74) Attorney, Agent, or Firm — Absolute Technology Law Groub, LLC

(57) ABSTRACT

An apparatus and technique are used to fabricate optical microresonators. A fabrication chamber contains all fabrication materials and devices. The microresonators are fabricated from a glass preform mounted on a motorized spindle. A laser is focused onto the preform to partly or fully impinge on the preform. The laser's focus position is controlled by changing the positioning of a lens mounted on a translation stage. Piezoelectric control elements may be mounted to finished microresonators to control of nonlinear parametric oscillation and four-wave mixing effects of the microresonator, control of nonlinear optical stimulated Brillouin scattering and Raman effects of said microresonator and wideband tuning of the frequency spacing between the output modes of a nonlinear-Kerr-effect optical frequency comb generated with said microresonator.

33 Claims, 11 Drawing Sheets

(51) Int. Cl.
  *B23K 26/06* (2014.01)
  *B23K 26/38* (2014.01)

(56) References Cited

U.S. PATENT DOCUMENTS

| | | | |
|---|---|---|---|
| 4,896,327 A | 1/1990 | Ebberg | |
| 5,779,753 A * | 7/1998 | Vetter et al. | 65/105 |
| 6,040,550 A * | 3/2000 | Chang | 219/121.63 |
| 6,888,987 B2 | 5/2005 | Hunziker et al. | |
| 6,891,997 B2 * | 5/2005 | Sercel et al. | 385/30 |
| 7,224,866 B2 | 5/2007 | DeRoy et al. | |
| 2003/0111447 A1 * | 6/2003 | Corkum et al. | 219/121.69 |
| 2003/0164396 A1 * | 9/2003 | Suga et al. | 228/219 |
| 2007/0062918 A1 * | 3/2007 | Li et al. | 219/121.69 |
| 2010/0140236 A1 * | 6/2010 | Cai et al. | 219/121.72 |
| 2011/0008973 A1 * | 1/2011 | Kawaguchi et al. | 438/795 |
| 2011/0252930 A1 * | 10/2011 | DeVor et al. | 82/1.11 |

* cited by examiner

LASER MACHINING AND MECHANICAL CONTROL OF OPTICAL MICRORESONATORS

CROSS-REFERENCE TO RELATED APPLICATIONS

This application claims priority to U.S. Provisional Application No. 61/698,741 filed on Sep. 10, 2012.

STATEMENT OF GOVERNMENT INTEREST

The invention described herein was made by an employee of the United States Government and which may be manufactured and used by the Government of the United States of America for governmental purposes without the payment of any royalties thereon or therefore.

FIELD OF INVENTION

This invention relates to the field of optical microresonators, and more specifically to rapid laser fabrication of optical microresonators

BRIEF DESCRIPTION OF THE DRAWINGS

FIG. 9b illustrates a graph displaying test stabilization data from the system of FIG. 9a.

TERMS OF ART

Figure 1:
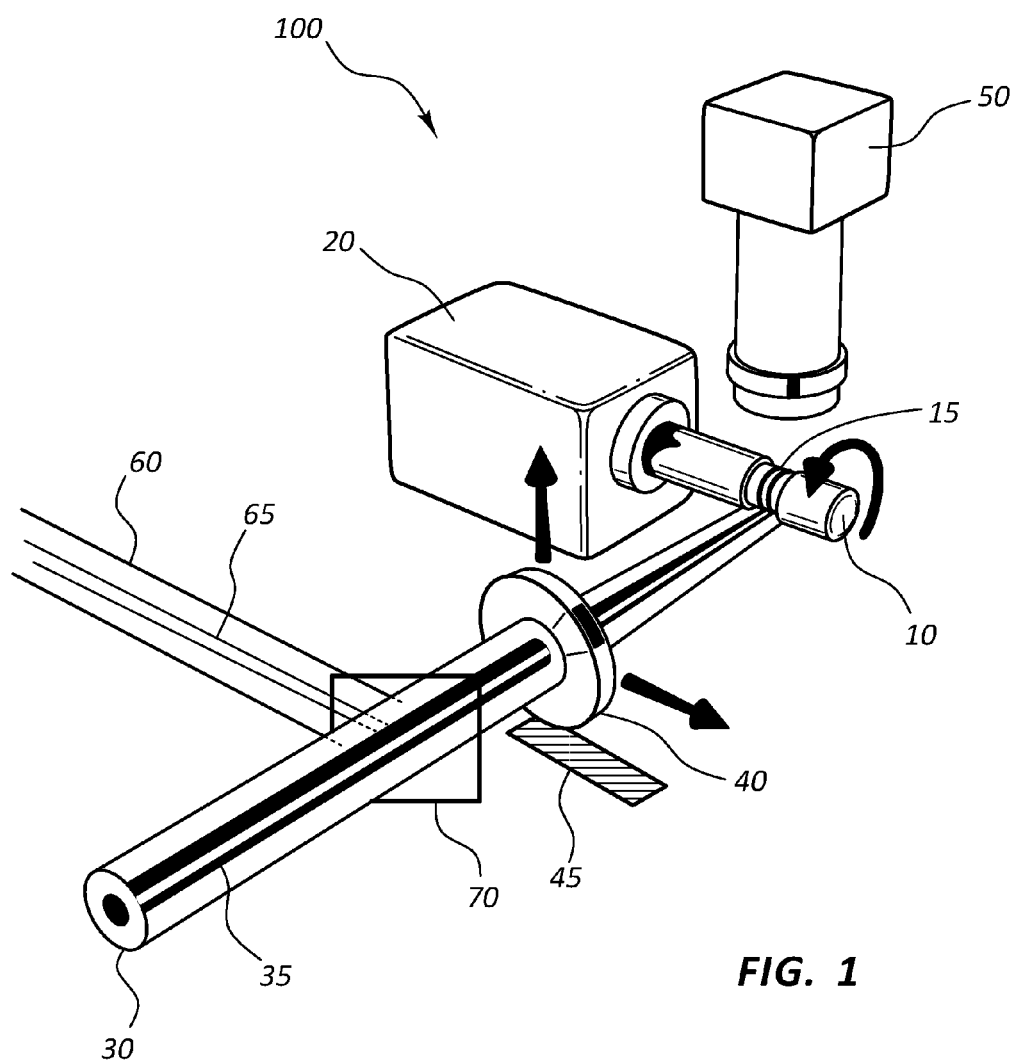
FIG. 1 illustrates an exemplary embodiment of a system for the fabrication of optical microresonators.

As used herein, the term "microresonator" refers to an optical device with the capability to support whispering gallery modes.

As used herein, the term "piezoelectric" refers to a quality or the effect of inducing mechanical stress in a material by applying an electric voltage which leads to expansion of the material.

As used herein, the term "plurality" means a quantity of two or more.

As used herein, the term "shape" means the measurable physical characteristics of an optical microresonator including but not limited to thickness, diameter and radius of curvature.

BACKGROUND

Since their inception nearly 25 years ago, optical microresonators have had a major impact on many fields related to linear and non-linear optics. Optical microresonators are used in photonics technologies for laser stabilization, optical filtering and wavelength division multiplexing, as well as in nonlinear optics for Raman lasers, frequency comb generators, and Brillouin lasers. Optical microresonators are useful tools in cavity quantum electrodynamics and cavity optomechanics, where they couple mechanical motion with optical fields.

The capability for optical microresonators to achieve this result is due to the phenomena of the whispering gallery mode present in all microresonators. This phenomenon occurs when laser light is coupled into a circular waveguide, such as a glass ring or disk. When the light strikes the boundary of the waveguide at a grazing angle it is reflected back into the waveguide. The light wave can make many trips around the waveguide before it is absorbed, but only at frequencies of light that fit perfectly into the circumference of the waveguide. If the circumference is a whole number of wavelengths, the light waves superimpose perfectly each trip around.

The so-called "whispering gallery" microresonators can even detect and measure individual nanoparticles. This creates a more reliable and accurate detector for nanoparticles, and may help establish better safety standards for industrial manufacturing of products containing nanoparticles. Medical applications of whispering gallery microresonators include nanoparticle detection within the body, ensuring that nanoparticles are present at treatment or diagnostic sites and absent from areas where they could cause health complications.

Some prior art microresonators are fabricated using advanced clean room techniques and require a large number of fabrication steps including optical and electron beam lithography and several etching steps. Another prior art technique for fabricating microresonators from crystalline materials requires cumbersome manual polishing of the microresonator material, which can take several days. These techniques significantly increase the complexity of fabrication, end cost, and overall time required for fabrication of microresonators, creating obstacles to more wide-scale use.

Control and stabilization of optical frequency combs enables a range of scientific and technological applications, including frequency metrology at high precision, spectroscopy of quantum gases and of molecules from visible wavelengths to the far infrared, searches for exoplanets, and photonic waveform synthesis. Recently, a new class of frequency combs based on monolithic microresonators has emerged, which offer significantly reduced bulk, cost, and complexity beyond what is possible with conventional femtosecond-laser technology. Such factors stand in the way of next generation applications that will require high-performance optical clocks for experiments outside the lab.

In microcomb systems, the comb generation relies on parametric conversion provided by nonlinear optical effects and is enabled by high-quality factors (Q) and small mode volumes of microresonators. To date, microcombs have been explored with a number of microresonator technologies, including microtoroids, crystalline microresonators, microrings, fiber cavities, machined disks, and disk microresonators. Unique comb spectra have been demonstrated, featuring octave spans and a wide range of line spacings.

Microcombs present a challenge for frequency stabilization. Specifically, the center frequency of a microcomb spectrum is matched to a pump laser, and line spacing must be controlled by changing the microresonator's physical properties. Future metrology applications of microcombs will require stabilization of the line spacing with respect to fixed-optical and microwave frequency standards. Hence, the key factors for stabilization are line spacing in the measurable 10's of GHz range, low intrinsic fluctuations, and the capability for fast modulation. Additionally, a threshold power for comb generation in the milliwatt range and the potential for integration with chip-based photonic circuits would enable portable applications.

In prior art, only thermal control via the power of a pump laser has been used in microresonators. However, this technique is not applicable in microresonators with small thermal effect or slow thermal response time.

It is desirable to create optical microresonators quickly and with a minimal number of processing steps.

It is also desirable to stabilize microcomb frequencies in optical microresonators without resorting to thermal control.

SUMMARY OF THE INVENTION

The invention is a novel device and technique to fabricate optical microresonators. The microresonators are fabricated from a glass preform mounted on a motor spindle. A laser is set perpendicular to the preforms's axis and focused onto the preform. The laser's focus position is controlled by changing the positioning of a lens mounted on a translation stage. Piezoelectric control elements may be mounted to finished microresonators to control the optical path length of a whispering gallery mode in the microresonators.

DETAILED DESCRIPTION OF INVENTION

For the purpose of promoting an understanding of the present invention, references are made in the text to exemplary embodiments of a system for fabricating an optical microresonator, only some of which are described herein. It should be understood that no limitations on the scope of the invention are intended by describing these exemplary embodiments. One of ordinary skill in the art will readily appreciate that alternate but functionally equivalent components and methods may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale. Instead, emphasis has been placed upon illustrating the principles of the invention. Like reference numerals in the various drawings refer to identical or nearly identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of a system 100 for the fabrication of optical microresonators. Exemplary system 100 has a preform 10 from which an optical microresonator 15 is formed, a motorized spindle 20, a fabrication laser 30 which delivers a laser beam 35, a focusing lens 40 mounted to a translation stage 45, a imaging system 50, an alignment laser 60 which delivers a laser beam 65, and a beam combiner 70. These components are contained within a fabrication chamber 80 (not shown).

Preform 10 is a preform of glassy material, such as, but not limited to, fused silica, fused quartz, erbium doped silica, ZBLAN, chalcogenide glasses, germanium oxide, ZBLAN or other glasses with high nonlinear coefficients and glassy materials with sufficient absorption at the wavelength of the laser 30 and low absorption at a different wavelength that can be coupled into a whispering gallery mode. Materials may be application specific. In various embodiments, materials may be used which have properties which correspond to the visible, ultra-violet, infrared and telecommunications wavelength ranges. The embodiment in FIG. 1 contemplates that the materials used have a measurable optical absorption that may be correlated for a desired wavelength. In various embodiments optical information may be obtained using known material properties and correlating these properties to known wavelength ranges.

Preform 10 can be pre-heated in order to avoid re-deposition of material during the fabrication process. While in the exemplary embodiment the preform 10 is a solid cylinder, other contemplated embodiments may have a different shape or may be hollow and pressurized from the inside in order to induce a bulge when heated. Preform 10 may have an initial diameter within the range of about 0.5 mm to about 10 mm. An optimum diameter range for a preform 10 of fused quartz material is about 2 mm to about 8 mm.

Motorized spindle 20 controls rotational speed of the preform 10. Rotational speed may be anywhere from about 10 revolutions per minute to 2000 revolutions per minute, with an optimum speed of about 800 revolutions per minute. This speed can be adjusted by computer control or manually to control the evaporation and/or melting of preform 10. Motorized spindle 20 must have a low runout, or a low change in outer radius of preform 10 from the axis of rotation as preform 10 is rotated. Runout should be below 20 microns to ensure accurate fabrication. In an exemplary embodiment, motorized spindle 20 is a ball-bearing spindle known in the art. Other exemplary spindles may include, but are not limited to an air bearing spindle.

Fabrication laser 30 is a $CO_2$ laser or another type of laser that operates at a wavelength with sufficient glass preform optical absorption. Fabrication laser 30 can be run in pulsed and/or continuous wave mode. Fabrication laser 30 produces a laser beam 35 has a first beam diameter $D_1$, a horizontal position $X_1$ and a vertical position $Y_1$. Beam diameter may range from about 30 microns to about 300 microns. Focus and/or power of fabrication laser 30 can be changed to control the melting and/or evaporation of the material of the preform 10. The power may range from about 3 W to about 30 W. Additionally, laser beam 35 can be spread out into a plane that is non-parallel to the rotational axis of preform 10 in order to achieve a more uniform melting and/or evaporation.

Focusing lens 40 may be made of, but is not limited to, a zinc-selenide (ZnSe) material. In use, focusing lens 40 is movable from a first position $Pos_1$ along at least one axis perpendicular to said fabrication laser 30 to a plurality of subsequent positions $Pos_n$. Due to this movement, $D_1$, $X_1$ and $Y_1$ are altered proportionately to $D_n$, $X_n$ and $Y_n$ for each of said plurality of positions $Pos_n$. Changing the position of the laser beam 35 relative to the preform 10 can be controlled, for example by changing the position of focusing lens 40 via translation stage 45. Translation stage 45 may be, but is not limited to, a manually-adjusted stage or a computer-controlled motor translation stage. This translation stage 45 may move focusing lens 40 in a sweeping pattern along preform 10. Sweep speed may range from 2 mm/s to 25 microns/s.

Imaging system 50 may be, but is not limited to, a microscope coupled to a CCD camera. The microscope is configured to have a lens which is optimized for a large depth of focus. High image resolution to observe the surface roughness of the microresonators is an important aspect of the imaging system 50. In other embodiments, it may also be advantageous to use a thermal imaging camera, such as a microbolometer array.

Imaging system 50 may be operatively coupled to a computer processing component adapted to take measurements of a shape of said glass preform while said laser beam 35 partially or fully impinges on the glass preform 10. These measurements may be, but are not limited to, a radius of curvature, a thickness and a diameter of said glass preform. These measurements can be compared to measurements previously entered into the computer processing component through a user interface. The computer processing components may also be used to monitor $D_n$, $X_n$ and $Y_n$ for each of said plurality of positions $Pos_n$.

Once measurements have been made and compared, the computer processing component may perform one of two output steps. It may output the current measurements, measurement comparison, and/or initial measurements to a user output to permit the user to manually adjust the fabrication process. The computer processing component may also perform an automated adjustment of laser beam 35 by positioning focusing lens 40 to produce an optical microresonator to correspond to the input values. Once the process is complete, it may then power down laser beam 35.

Alignment laser 60 is contemplated for the exemplary system 100, if fabrication laser beam 35 is not visible to the eye and/or camera. Alignment laser beam 65 is combined with laser beam 35 to produce a visible guide to the laser machining. A beam combiner 70 is positioned to combine the two laser beams before they are transmitted by focusing lens 40. Beam combiner 70 may be, but is not limited to, a zinc-selenide (ZnSe) combiner.

Fabrication chamber 80 serves to contain all of the above components and shield them from damage or interference during the fabrication process. Fabrication chamber 80 also prevents ablated material from spreading to the surrounding area and causing a safety hazard. Fabrication chamber 80 also allows fabrication of microresonator 15 to be performed in a surrounding gas with low humidity. This avoids a reduction in optical quality factor of the whispering gallery mode due to OH— and water absorption bands. The surrounding gas could be, but is not limited to, nitrogen, clean noble gasses or other inert gasses. Additionally, fabrication of microresonator 15 can be performed in a surrounding gas that is embedded into the microresonator material in order to change the optical material properties. Furthermore, an additional gas blown against the rotating preform 10 can be used to avoid re-deposition of evaporated material onto the preform 10. Finally, preform 10 can be immersed in a liquid during laser-shaping in order to control the melting and/or evaporation process.

During fabrication using the exemplary system 100 of FIG. 1, glass preform 10 is preselected from a material having optical properties which correspond to desired wavelength ranges. The preform 10 is then mounted on motorized spindle 20 within fabrication chamber 80. Coarse alignment of laser beam 35 is supported by alignment laser beam 65 that is superimposed with beam combiner 70. The laser beams 35 and 65 are focused onto preform 10 with focusing lens 40 that is mounted on a translation stage 45 with micrometer resolution. In order to monitor the fabrication process, imaging system 50 is mounted on top of the preform 10. Fabrication laser 30 is used to evaporate and/or melt preform 10 to fabricate a protrusion that supports an optical whispering gallery mode. There is a contrast in the refractive index of the microresonator material and the surrounding area.

Figure 2:
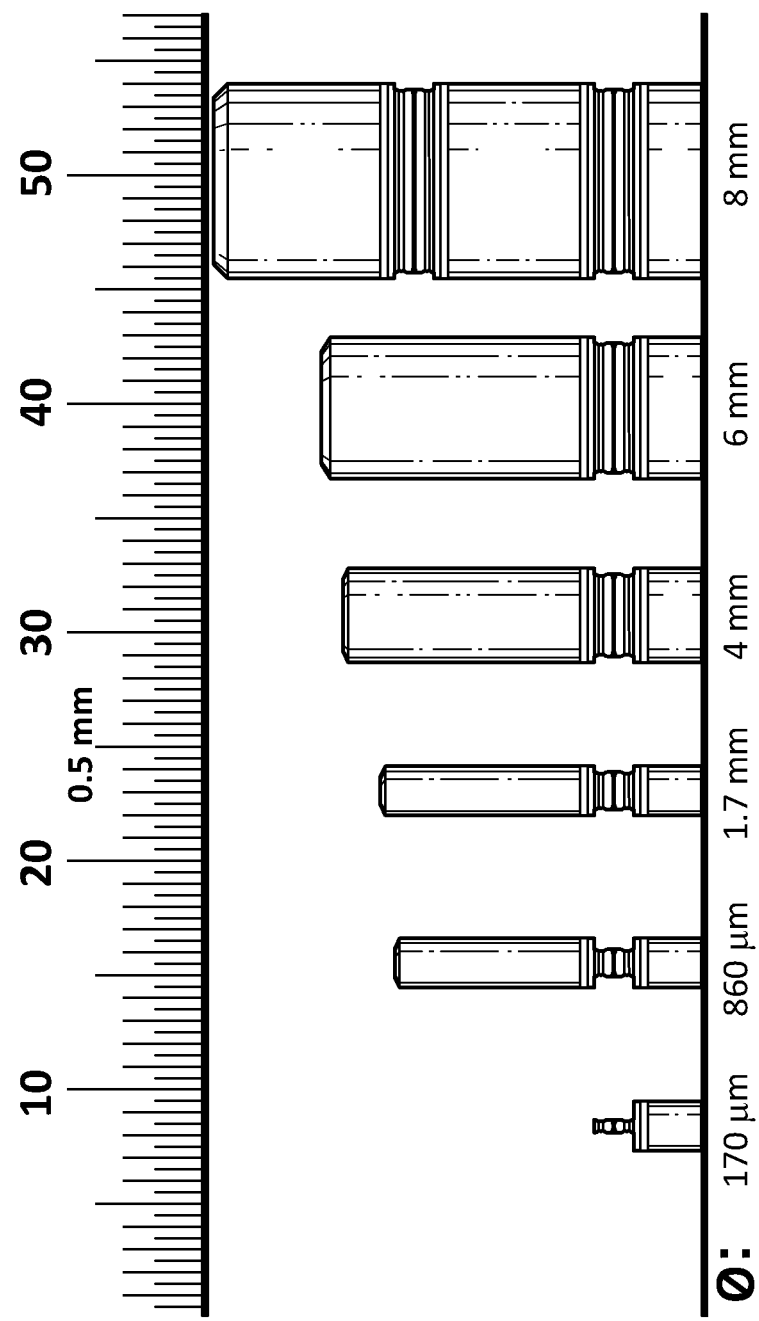
FIG. 2 illustrates fabricated microresonators with varying diameters.

In addition to shaping a microresonator, the laser 30 can also be used to change the diameter of the preform 10, exemplary embodiments of which are shown in FIG. 2. This is done by turning the preform 10 at approximately 800 RPM and slowly approaching the focusing lens 40 from below while sweeping it back and forth along the preform 10 axis (sweep speed 0.3 mm/s; laser power approximately 30 W). All of the resulting microresonators 15 in FIG. 2 have been treated with this method in order to evaporate the surface layer and create a symmetric microresonator with respect to the rotation axis of the motorized spindle 20. The first two microresonators 15 in FIG. 2 have been shrunk more significantly, starting from a 2-mm-diameter preform 10 down to 170 microns and 860 microns, respectively. The final diameter of the preform 10 can be controlled to a level of 10 microns, corresponding to an approximately 160 MHz control of the microresonator's free spectral range in a 2 mm diameter device.

Figure 3A:
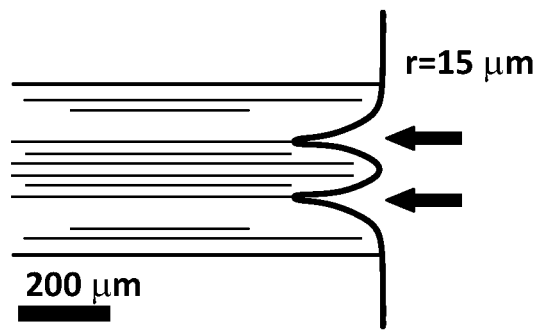
FIGS. 3a-3c illustrate different curvatures of whispering-gallery side walls between 15 microns and 125 microns.
Figure 3B:
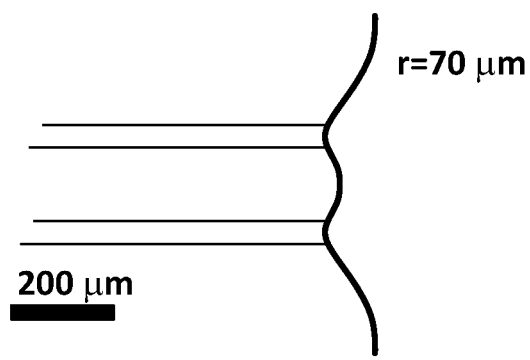
Figure 3C:
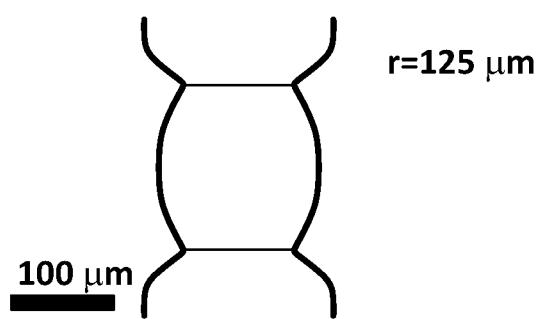

FIGS. 3*a*-3*c* display the results of further exemplary processing of the optical microresonator 15. In a subsequent fabrication step, the whispering-gallery mode of microresonator 15 is shaped by cutting two rings into the preform 10 (arrows in FIG. 3*a*). The remaining glass between the two rings confines the optical whispering-gallery mode. Moreover, the curvature of the whispering-gallery side walls can be controlled by adjusting the distance between the two rings. The whispering gallery mode can be shaped in a way that adjusts microresonator dispersion to enable four-wave-mixing induced frequency conversion with more than 10 generated modes from a single continuous wave laser.

FIGS. 3*a*-3*c* illustrate different curvature radii between 15 micron and 125 micron radius, which affect the cross-section of the optical modes. Control of this curvature is important to increase the mode confinement as well as to change the dispersion of the microresonator 15, e.g., for broadband optical frequency comb generation via four-wave mixing. The microresonator 15 in FIG. 3*a* is shaped by directly focusing the laser beam onto the preform 10, while the microresonators 15 in FIGS. 3*b* and 3*c* are fabricated by placing the center of the focus slightly below the preform 10. In the case of the directly applied laser beam, the cutting process self-terminates when the heat transport through the surrounding material inhibits deeper cutting. Focusing below the preforms 10 also leads to a self-terminating cutting after a sufficient amount of material is evaporated. Both processes create a smooth surface at the microresonator sidewall, induced by the surface tension of the melted glass. Best results were obtained by applying the laser 30 for 3 seconds at each axial cutting position for a total of 20 iterations while the microresonator 15 is turning at approximately 200 RPM. The laser power in the fabrication process may be adjusted to accommodate for the size of the preform 10 and the distance between the cutting rings.

Figure 4A:
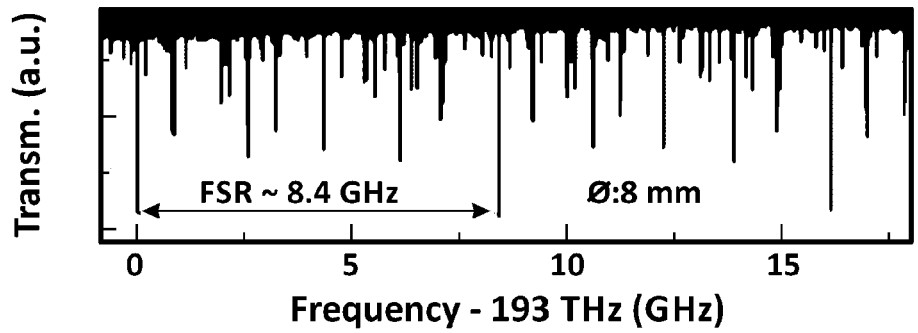
FIGS. 4a-4e illustrate graphs displaying characteristic properties of microresonators created using the system of FIG. 1.

FIGS. 4*a*-4*e* illustrate characteristic properties of microresonators 15 created using system 100. The fabricated microresonators 15 are characterized for their optical quality and nonlinear properties with a coupling setup using a tapered optical fiber. FIG. 4*a* shows the mode spectrum of an 8 mm diameter microresonator 15 obtained by sweeping an external cavity diode laser over approximately 2 free spectral ranges of the cavity. Around 30 different mode families are observed. The different mode families are polarization dependent, and coupling to a certain mode family can be optimized by adjusting the polarization of the input light and the taper position.

Figure 4B:
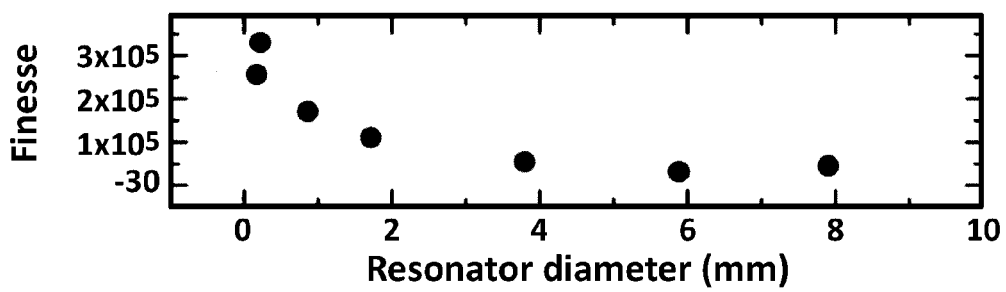
Figure 4C:
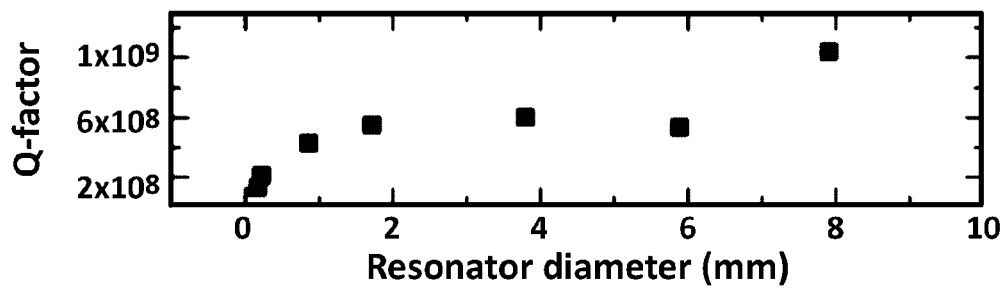

FIGS. 4b and 4c show the measured finesse and quality factor for microresonators 15 of sizes ranging from 170 micron diameter to 8 mm diameter. The obtained quality factors are above $Q=10^8$, with the highest quality factor exceeding $Q=10^9$ in the 8 mm diameter device, which is most likely limited by OH-absorption. Based on the specified 5 ppm (weight) OH-content of the preforms 10, material-loss-limited quality factors are expected to be around $Q=2\times10^{10}$. The measured quality factors are expected to be slightly smaller as a result of an increased OH content during the fabrication process in air. In addition, the slightly reduced quality factors in smaller microresonators 15 are not yet limited by radiative whispering-gallery losses and could potentially be increased by further optimization of the fabrication parameters in order to reduce material and surface losses.

Figure 4D:
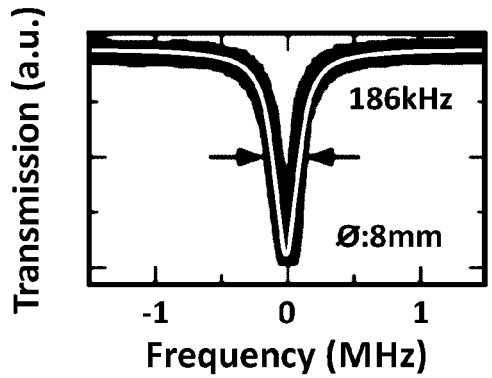
Figure 4E:
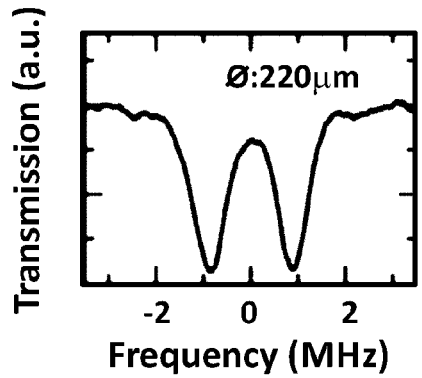

FIGS. 4d and 4e show measured mode profiles in an 8 mm diameter and a 220 micron diameter microresonator 15. Mode splitting due to scattering induced coupling of clockwise and counter-clockwise modes is only observed in small microresonators 15 with diameters of 220 microns and below. This suggests that the quality factors in larger devices are predominantly limited by light absorption in the material.

FIGS. 5a-5e show measurements of different nonlinear effects in microresonators 15 fabricated using the exemplary system of different sizes at a launched pump power of approximately 100 mW. With optical quality factors exceeding $Q=10^8$, the exemplary microresonator 15 is an ideal candidate for nonlinear optics at low threshold powers. Four-wave mixing induced frequency comb generation can be observed with different mode spacings between 300 GHz (FIG. 5a) and 8.4 GHz (FIG. 5b) according to the microresonator size. This four-wave mixing process is largely suppressed in the 6 mm diameter microresonator with a mode spacing of approximately 11 GHz, which is close to the maximum of the Brillouin shift in fused silica.

Figure 5A:
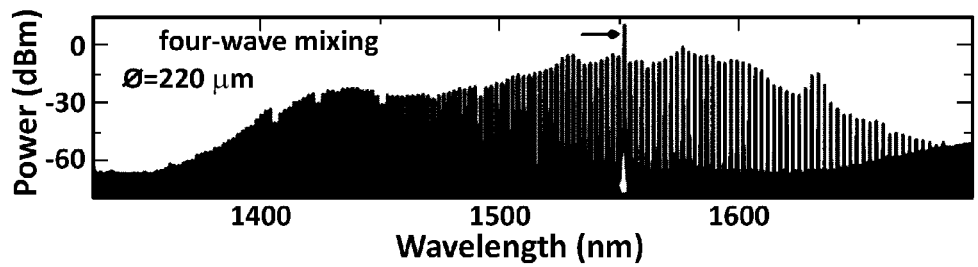
FIGS. 5a-5e illustrate graphs displaying nonlinear optical effects of microresonators created using the system of FIG. 1.
Figure 5B:
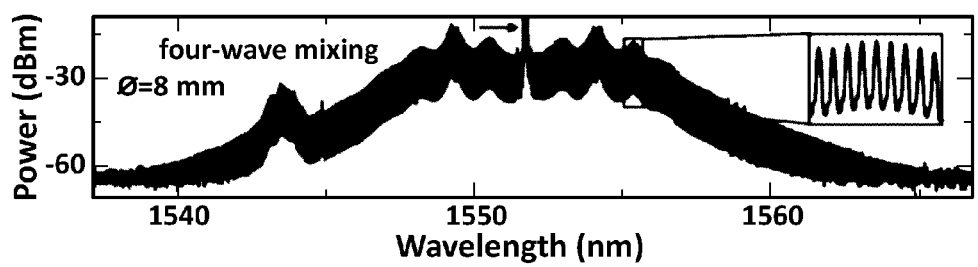
Figure 5C:
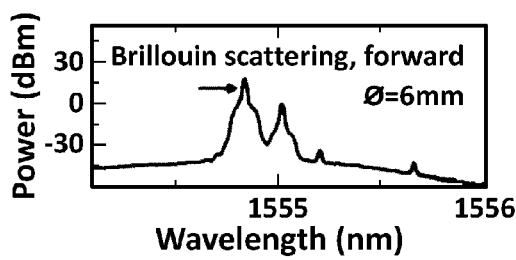
Figure 5D:
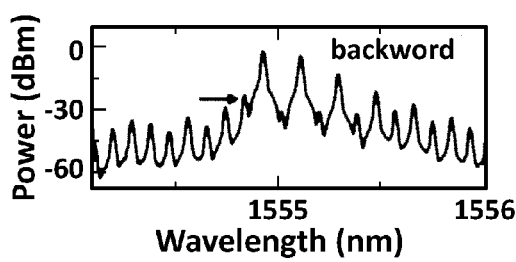

As shown in FIGS. 5c and 5d, one may observe several orders of Brillouin sidebands. As previously reported in chip-based disk microresonators, even order sidebands are observed in the forward direction and odd orders of sidebands are scattered in the backward direction with respect to the pump light. The backward-directed spectrum in FIG. 5d has been obtained through a fiber-optic circulator at the input of the tapered optical fiber that was used for coupling.

Figure 5E:
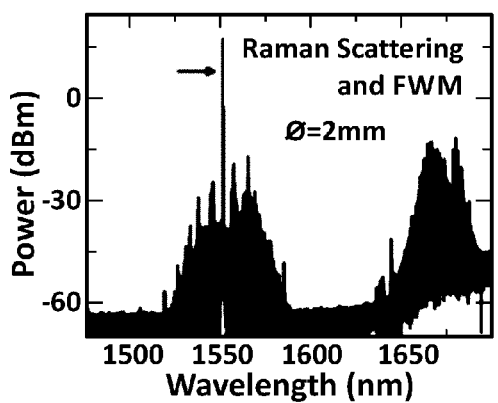

FIG. 5e shows an example of a mixture of Raman scattering and four-wave mixing in a 2 mm diameter microresonator 15. The threshold for Raman scattering and four-wave mixing in this device is around 1 mW and depends on the coupling conditions as well as the microresonator geometry. Adjusting these parameters allows a user to change the relative nonlinear threshold of these two effects.

Figure 6A:
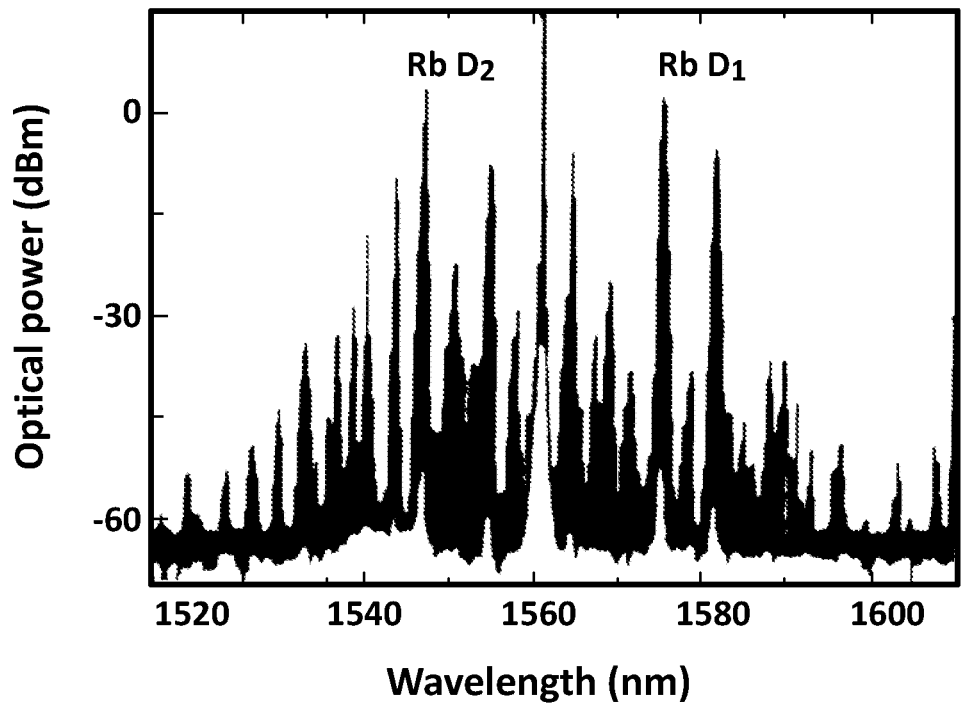
FIGS. 6a and 6b illustrate graphs displaying microcomb line spacing and optical spectrum of microresonators created using the system of FIG. 1.

To generate microcomb spectra as seen in FIG. 6a, a microresonator fabricated using the above exemplary system 100 is pumped with light coupled via a tapered fiber. The pump laser, a tunable semiconductor laser operating near 1560 nm, is amplified in erbium fiber and then spectrally filtered to remove noise from amplified spontaneous emission; 280 mW of light is available at the input to the tapered fiber. The microresonator is thermally self-locked to the pump laser, allowing stabilization of the microcomb center to an auxiliary laser, which in turn is frequency doubled and referenced to a rubidium (Rb) D2 transition at 780 nm. The Rb atoms provide an absolute fractional stability of approximately $10^{-11}$ at 1 second, but the 1-s residual noise of <10-17 between the microcomb pump and the auxiliary laser indicates that much more stable references can be employed in the future. The spectrum of the comb, which spans about 100 nm, also reaches the corresponding wavelength (1590 nm) of Rb D1 lines at 795 nm. Stabilization of the 32.6-GHz line spacing is measured by photodetection. After conversion to baseband (described below), the line-spacing signal is analyzed with respect to ultralow phase- and frequency-noise hydrogen-maser oscillators. Line spacing is optimized using microresonator mode, taper-resonator coupling, and pump detuning and polarization, such that its spectrum exhibits only a single clean peak. Under different conditions, particularly at high pump power, multiple peaks are visible in the line-spacing signal. These effects prevent users from using 33-GHz microresonator combs with more continuous and smoother intensity envelopes, and bandwidths up to approximately 150 nm.

Figure 6B:
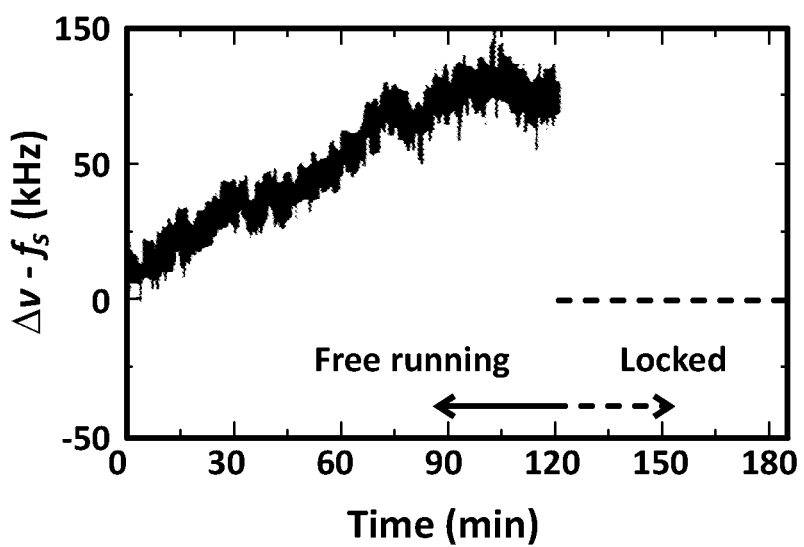

FIG. 6b shows a two-hour record of the free-running microcomb line spacing, which is an important measure of comb performance. The 1-s Allan deviation for 100-s increments of these data, taken under typical laboratory conditions, ranges from $2\times10^{-8}$ to $2\times10^{-7}$.

Figure 7:
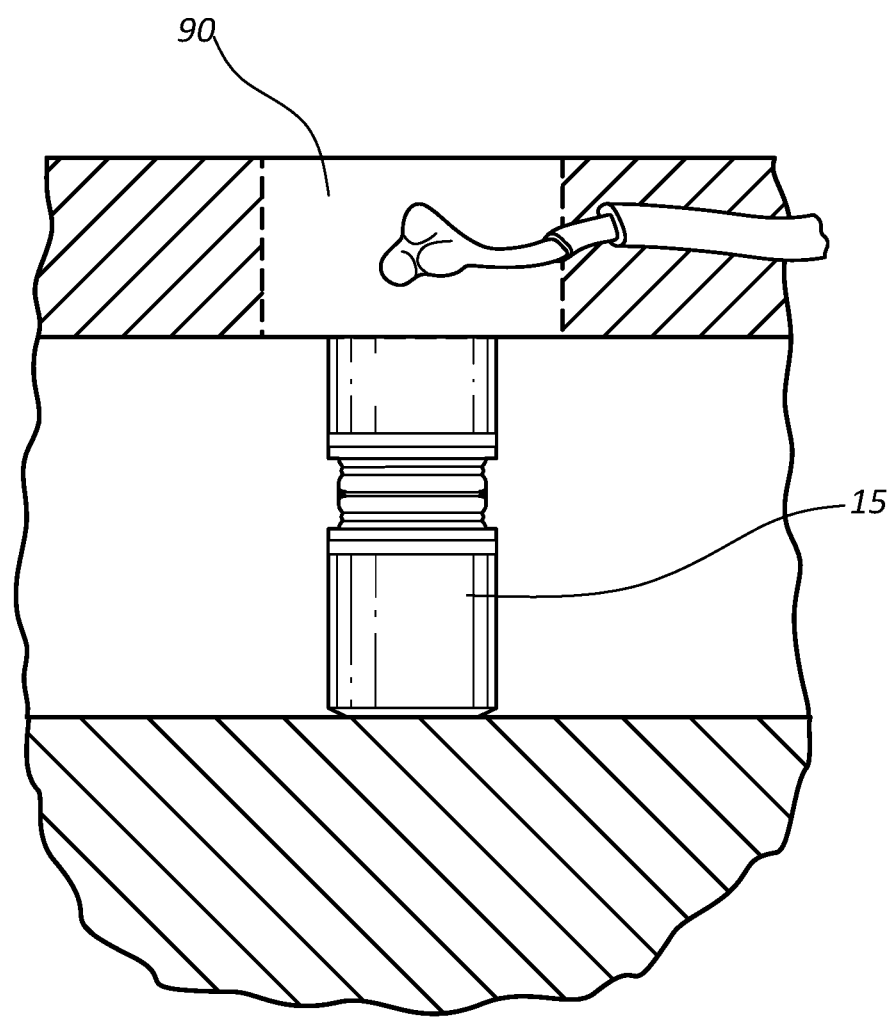
FIG. 7 illustrates a piezoelectric control apparatus operatively connected to a microresonator created using the system of FIG. 1.

FIG. 7 illustrates an exemplary mechanism for control of the comb's line-spacing noise via a mechanical force applied along the axis of the microresonator 15. A piezoelectric element 90 is used to compress the microresonator 15, resulting in radial expansion and tuning of the microresonator's mode structure. While piezoelectric element 90 is a lead-zirconate-titanate (PZT) transducer in the exemplary embodiment, other piezoelectric elements are contemplated, such as other piezoelectric ceramics, piezoelectric plastics and piezoelectric crystals.

In use, a mechanical force from piezoelectric element 90 is used to control the optical path length of a whispering gallery mode in microresonator 15. The piezoelectric element 90 is used to mechanically influence microresonator 15, inducing a change in the free spectral range of microresonator 15. Utilizing the Poisson effect, axial compression results in an expansion of microresonator 15 and changes its frequency comb. A circuit controlling piezoelectric element 90 has a 150 V maximum output and wide bandwidth modulation capabilities.

Piezoelectric element 90 may apply a mechanical force to a microresonator 15 (e.g. by bending and/or compressing the microresonator). In this embodiment, the piezoelectric element 90 is a flat, rectangular element which measures about 3 mm by 3 mm by 2 mm. Piezoelectric element 90 is centered on the microresonator 15 such that motion and force from actuation of piezoelectric element 90 are transmitted axially to microresonator 15 without causing any lateral displacement. In one embodiment, a holding structure may be used to connect piezoelectric element 90 and microresonator 15, and ensure effective axial transmission of motion and force.

Piezoelectric element 90 may also apply a mechanical force radially by fitting a piezoelectric element 90 around a rod-shaped microresonator 15, permitting it to be compressed or extended. In this embodiment, the piezoelectric element 90 is ring-shaped and closely fitted around microresonator 15, eliminating the need for a holding structure.

A feedback loop composed of a feedback servo which has proportional and integral gain and a digital phase detector stabilizes the free spectral range of microresonator 15. An optical frequency comb is generated in microresonator 15 and the beat note between comb-modes is measured electronically and stabilized via said feedback to microresonator 15. The feedback servo compares a reference frequency to the beat note and sends a signal which keeps the frequency and beat note synchronized.

Figure 8A:
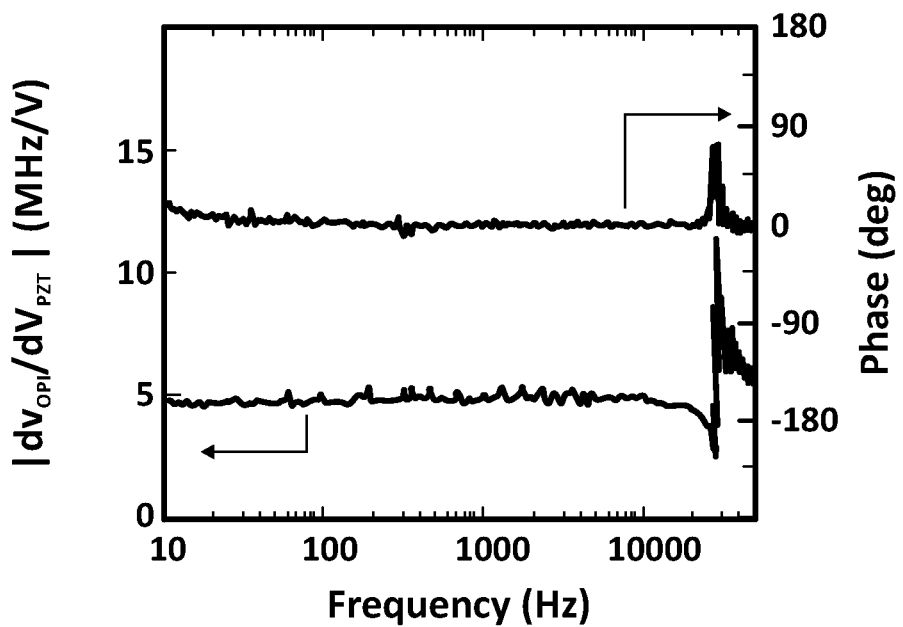
FIGS. 8a and 8b illustrate graphs displaying the response of optical resonance and microcomb line spacing of the piezoelectrically controlled microresonator of FIG. 7.
Figure 8B:
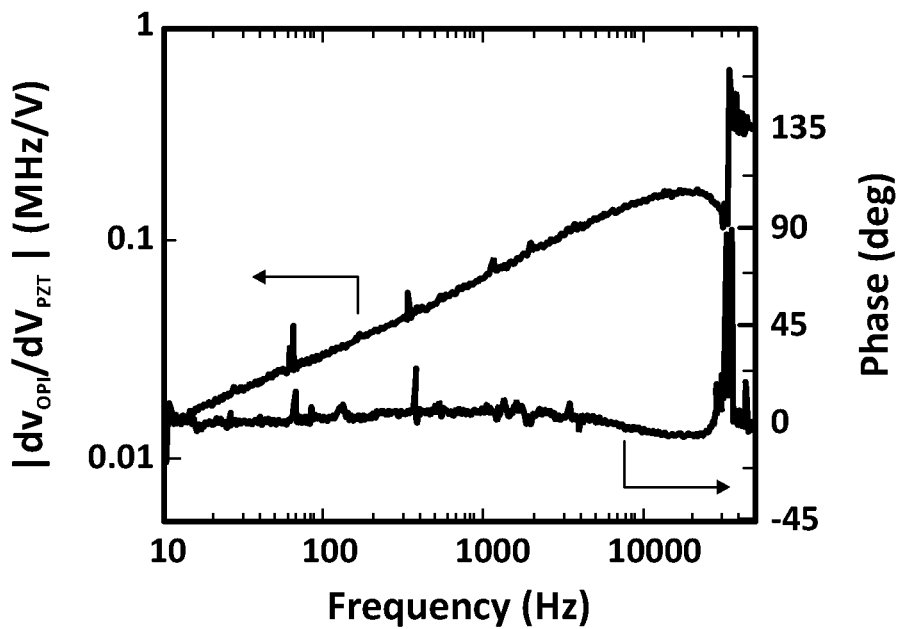

FIGS. 8a and 8b characterize the modulation response of a microresonator mode and the line spacing of the comb, respectively. For a pump power well below thermal hysteresis, the resonance frequency of a mode is monitored as the PZT voltage varies as shown in FIG. 8a. The PZT piezoelectric element 90 adjusts the mode frequency by 5 MHz/V (approximately 800 MHz total range) below a mechanical resonance of the system at 25 kHz. This response is less than what is expected ($P_{PZT}v/E \times 192$ THz=140 MHz/V), given Young's modulus E and Poisson ratio v for fused quartz, and the approximately 0.3 MPa/V PZT stroke. The discrepancy is likely explained by a poor mechanical connection, but the lower response has not limited experiments. Finite-element simulations suggest that the off-center PZT piezoelectric element 90-resonator 15 mounting used is not yet optimized for generating compression. The line spacing of the comb also tunes with PZT piezoelectric element 90 voltage up to 25 kHz, as shown in FIG. 8b; however, microresonator thermal locking reduces the response at low frequencies. A near-zero phase delay between the modulation and the PZT piezoelectric element 90-induced response indicates the passive nature of the thermal lock, and satisfies a basic requirement for providing useful feedback. The PZT piezoelectric element 90 enables stabilization of the line spacing, which is evident starting at 120 min in FIG. 6b above, for a wide range of pump-resonator detunings and for different microresonator modes. Conversely, turning points in the PZT piezoelectric element 90 control exist at which the line-spacing response (and noise) is reduced. This behavior is well known from laser-based combs.

Figure 9A:
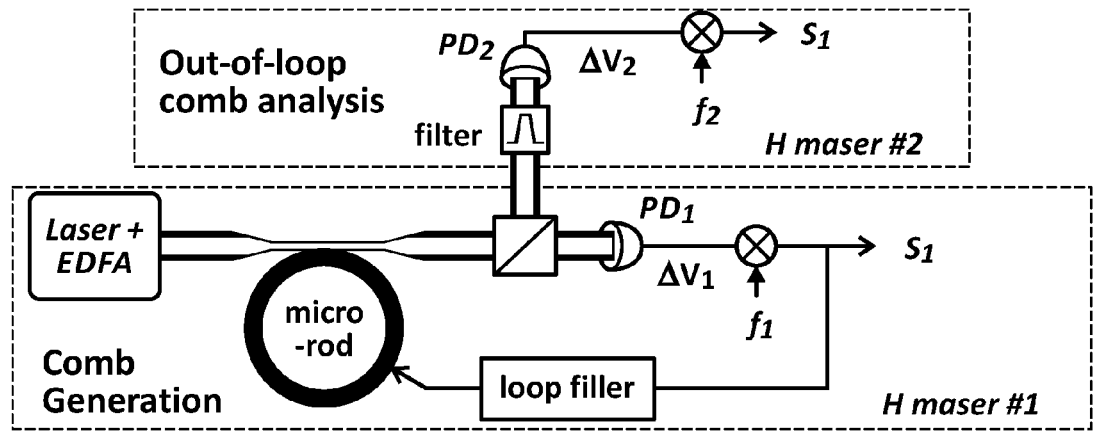
FIG. 9a illustrates a schematic of a test system for the piezoelectrically controlled microresonator of FIG. 7.
Figure 9B:
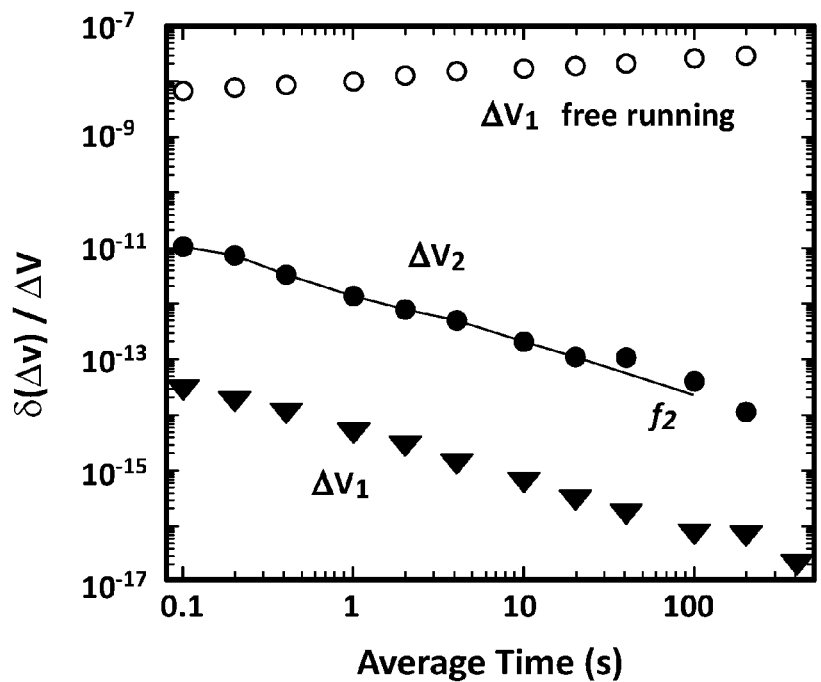

FIGS. 9a and 9b illustrate how line spacing can be examined in detail to understand a microcomb's potential for replicating in each comb line the stability of state-of-the-art frequency references. FIG. 9a shows the important elements of the apparatus. Following generation, the microcomb spectrum is delivered to two systems for independent stabilization and analysis. In both systems, the 32.6 GHz comb line spacing ($\Delta v_1$ and $\Delta v_2$) is photodetected, amplified, and converted to the baseband signals $S_1$ and $S_2$. Importantly, $S_{1,2}$ carry the fluctuations of both the line spacing and the microwave synthesizers ($f_1$ and $f_2$), which are locked to independent maser signals. Amplifier noise is less important than that of the synthesizers. The Allan deviation and phase-noise spectra of signals $S_{1,2}$ are recorded separately with a Symmetricom 5125A phase-noise and Allan deviation test set, which is referenced to maser 1 (2) for $S_1$ ($S_2$) measurements.

By initiating a phase-locked loop using $S_1$ and the PZT piezoelectric element 90, $\Delta v_1$ stabilizes with respect to maser 1. At an averaging time of 1 second, the $5 \times 10^{-15}$ residual fluctuations of $\Delta v_1$ (triangles in FIG. 9b) are far below the stability of maser 1. This result signifies that the microcomb closely follows the reference frequency $f_1$ and attains its stability. An analysis system (referenced to maser 2) tests the microcomb's ability to characterize independent microwave frequencies such as $f_2$. In FIG. 9b, the filled points show the combined fluctuations of $\Delta v_2$ and $f_2$, which are predominately due to $f_2$; the solid line in FIG. 9b shows the Allan deviation of $f_2$ from a separate measurement. These data confirm the expectation from residual measurements that the absolute stability of $\Delta v_2$ is significantly better than the $f_2$-synthesizer-limited $1.5 \times 10^{-12}$ at 1 second. The consistent 1/time averaging behavior observed in both residual and absolute measurements is evidence of the phaselocked stabilization. In contrast, the open circles in FIG. 9b show the free-running line spacing.

Figure 10A:
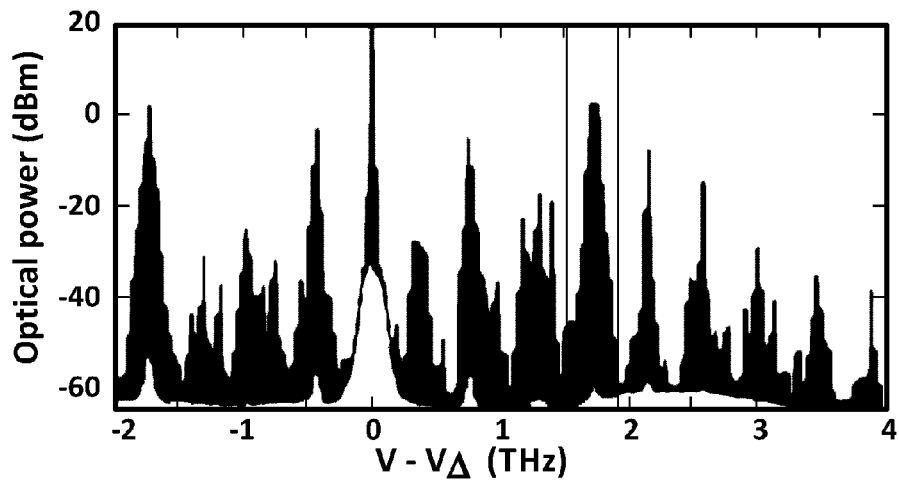
FIGS. 10a-10c illustrate graphs displaying line-spacing equidistance and stability for different spectral slices of a microcomb.
Figure 10B:
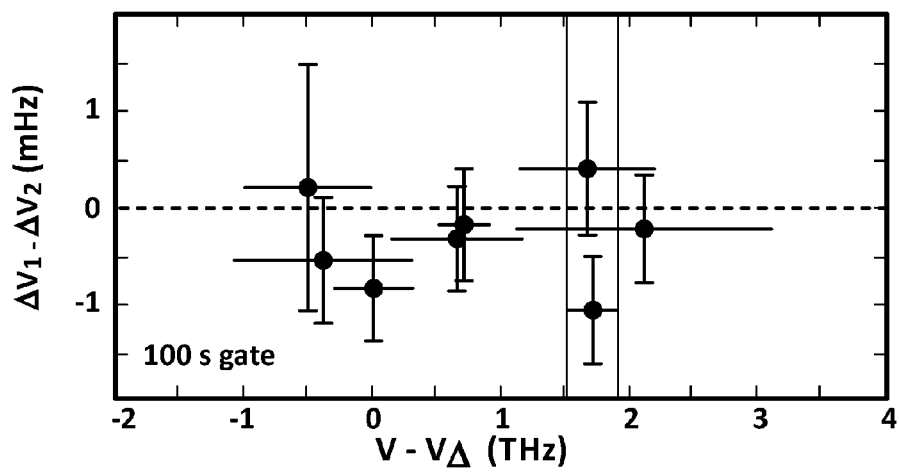
Figure 10C:
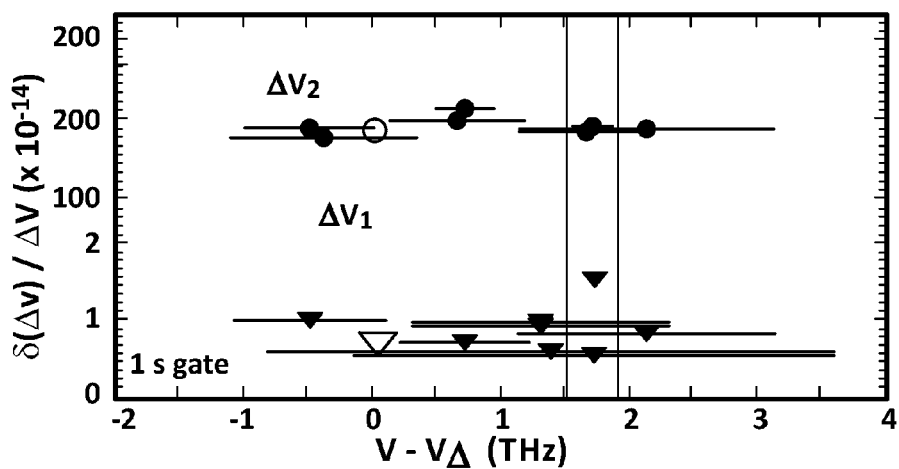

FIGS. 10a-10c illustrate line-spacing equidistance and stability for different spectral slices of the comb. The S1 signal used for line-spacing stabilization is a composite of all the comb lines, and its largest contributions naturally come from the most intense pairs. Hence, an uneven distribution of comb optical power, along with the complicated nonlinear comb-generation process, opens the possibility of degraded line-spacing stabilization for different spectral slices of the comb. To quantify these effects, the line-spacing frequency and its stability are probed with (maser-2 referenced) analysis system. A 1535 nm to 1565 nm (C-band) programmable optical filter with 10 GHz resolution is used to select a portion of the comb (FIG. 10a) for $\Delta v_2$ analysis. FIG. 10b shows measurements of the difference in line spacing ($\Delta v_1$-$\Delta v_2$) between the entire comb and various portions thereof. Here, the horizontal bars correspond to the transmission window of the filter for each $\Delta v_2$ measurement, and $\Delta v_1$ is determined by the lock point of the phase-locked loop. (The residual offset between maser 1 and locked $S_1$ is <1 microHz.) The weighted mean of all data is −0.4 mHz (on the 32.6 GHz line spacing) from the anticipated null, which is consistent with measurement uncertainty. 21.3(13) mHz, which arises from the frequency offset between the two independent masers that reference $f_1$ and $f_2$, is subtracted from these measurements. A fit of the slope in FIG. 10b demonstrates that the line spacing does not change by more than the $5 \times 10^{-15}$ standard error over a 4.5 THz span of the comb.

The line-spacing stability of the spectral slices also characterizes the PZT piezoelectric element 90 stabilization. FIG. 10c shows the 1-s Allan deviation associated with each 400-s long frequency difference measurement. The stability of $\Delta v_2$ throughout the C-band portion of the comb is $1.5 \times 10^{-12}$, a value dominated by frequency synthesizer $f_2$. It appears that the mechanisms responsible for line-spacing noise act similarly to different components of the comb and PZT piezoelectric element 90 control can effectively counter them. To understand the residual stability of $\Delta v_2$ that is possible apart from the noise of $f_2$, the system was reconfigured to use $f_1$ for baseband conversion of both $\Delta v_1$ and the optically filtered $\Delta v_2$. In this case, common $f_1$ noise contributions are suppressed when the $S_{1,2}$ signals are presented to the noise analyzer. What remains are uncontrolled jitter between the spectral slices and the whole comb, and the noise associated with the independent optical and electrical measurement paths including the Symmetricom analyzer. The level of these residual fluctuations is mostly below $10^{-14}$ at 1 second; see the closed triangles in FIG. 10c. This demonstrates that future microcomb experiments could take advantage of frequency references even more stable than a maser.

Figure 11:
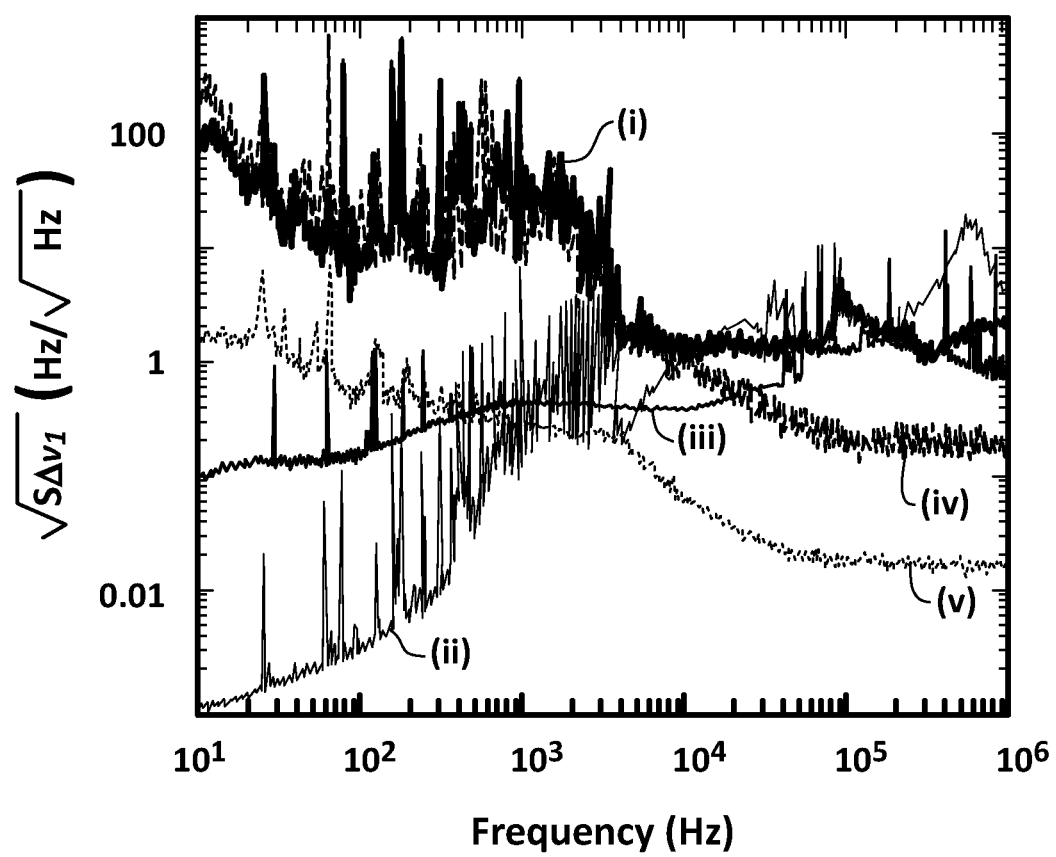
FIG. 11 illustrates a graph displaying a spectrum of line-spacing fluctuations.

FIG. 11 illustrates the spectrum of line-spacing fluctuations $S_{\Delta v1}$. To understand the pathway for future improvements in line-spacing stability, the free-running noise spectrum is characterized $\Delta v1$; see the (i) curve in FIG. 11. Servo electronics reduce the frequency-noise spectrum by up to 105 within the 25 kHz bandwidth permitted by the PZT piezoelectric element 90, and the spectrum after stabilization is shown by the (ii) curve in FIG. 11. Achieving further reduction in $S_{\Delta v1}$ will depend on improvements among the feedback mechanism and the underlying source of the noise, here focused on the latter. In the current system, the primary contribution to $S_{\Delta v1}$ is pump-frequency noise that maps onto the line spacing via a mostly constant relationship $\gamma_f$=10 Hz$_{\Delta v1}$/kHz. This calibration was performed by modulating the pump frequency and recording the associated modulation in $\Delta v1$. Measuring the spectral density of pump-frequency noise and scaling it by $\gamma f$ obtains the (iv) curve in FIG. 11. The mapping relationship $\gamma_p$=1.9 kHz/mW leads to the (v) curve in FIG. 11, characterizing the degree that pump intensity noise contributes to $S_{\Delta v1}$. It is surprising that intensity noise does not contribute more significantly to $S_{\Delta\nu1}$, especially in light of previous data. Still, characterization of $S_{\Delta\nu1}$ suggests that a lower noise pump laser should be used in future experiments. In particular, with a factor of 10 improvement, a residual frequency noise of <100 microHz/√Hz at a 10 Hz offset from the 32.6 GHz line-spacing signal would be possible. Noise contributions from the measurement system also appear in $S_{\Delta\nu1}$. The (iii) line shows the spectrum of $f_1$, which is generated by a high-performance commercial synthesizer.

While optical microresonators have become more and more popular during the last decade, most fabrication processes involve expensive clean-room equipment and lengthy processing steps. The invention described herein reduces both price and fabrication time for leading edge ultra-high-Q microresonators that have significant potential in future microphotonic applications.

This system and method of microresonator fabrication is extremely fast and versatile and reproducibly generates optical quality factors exceeding $5 \times 10^8$, and up to $1 \times 10^9$, which is comparable to the highest observed optical quality factors in prior fused-silica microresonators. Moreover, this system and method allow control of both the fundamental diameter as well as the shape of the microresonator sidewall by controlled ablation of material from the glass preform. In this way, microresonators can be manufactured with major diameters ranging from 170 microns up to 8 mm and with sidewall curvature radii between 15 microns and 125 microns. With their ultra-high quality factors and fabrication times below 1 minute, these microresonators are excellent tools for nonlinear optics experiments including low-threshold Raman scattering, Brillouin scattering, and optical frequency comb generation via cascaded four-wave mixing.

Finally, microcomb line-spacing stabilization using piezoelectric mechanical control is an effective means of line spacing control. This type of mechanical line-spacing control can be introduced into a variety of microcomb generators based on, for example, crystalline microresonators or chip-integrated devices via bending of the chip. Using piezoelectric mechanical control, microcomb residual noise is demonstrably capable of supporting modern frequency references beyond the $10^{-13}$ at 1-s level associated with the best traditional microwave oscillator technology. The piezoelectric element also enables frequency control of nonlinear parametric oscillation and four-wave mixing effects of the microresonator, control of nonlinear optical stimulated Brillouin scattering and Raman effects of said microresonator and wideband tuning of the frequency spacing between the output modes of a nonlinear-Kerr-effect optical frequency comb generated with said microresonator

What is claimed is:

1. An apparatus for the fabrication of an optical microresonator comprised of:
a fabrication chamber, wherein said fabrication chamber encloses an inert gas, a motorized rotating spindle, a preform of glass, a fabrication laser, a movable focusing lens and at least one computer processing component,
wherein said preform of glass is mounted to said motorized rotating spindle;
wherein said fabrication laser emits a fabrication laser beam having a first beam diameter $D_1$, a first horizontal position $X_1$ and a first vertical position $Y_1$, wherein said laser beam partly or fully impinges on said glass preform;
wherein said movable focusing lens has a first focusing lens position $Pos_1$, wherein said movable focusing lens is movable along at least one axis perpendicular to said laser along a plurality of subsequent positions $Pos_n$ and wherein $D_1$, $X_1$ and $Y_1$ are altered proportionately to $D_n$, $X_n$ and $Y_n$ for each of said plurality of positions $Pos_n$; and
wherein said at least one computer processing component is coupled to an imaging system adapted to take measurements of a shape of said glass preform while said laser beam partly or fully impinges on said glass preform.

2. The apparatus of claim 1, wherein said computer processing component is operatively coupled with a magnifying lens and camera which captures images in real time for said continuous measurement.

3. The apparatus of claim 2, wherein said camera is a CCD camera.

4. The apparatus of claim 2, wherein said camera is a thermal imaging camera.

5. The apparatus of claim 1 wherein said computer processing component is configured with software to continuously measure a radius of curvature, a thickness and a diameter of said glass preform.

6. The apparatus of claim 1 wherein said computer processing component is configured with software to measure said diameter $D_n$, said horizontal position $X_n$ and said vertical position $Y_n$ of said laser beam.

7. The apparatus of claim 1 wherein said computer processing component is configured with software to receive threshold input values for radius of curvature, thickness and diameter of said glass preform and to perform adjustment of said laser beam by positioning of said focusing lens to produce an optical microresonator to correspond to said input values.

8. The apparatus of claim 1 wherein said computer processing component is configured with software to receive threshold input values for curvature, thickness and diameter of said glass preform and to display said values to facilitate manual positioning of said focusing lens to produce an optical microresonator to correspond to said input values.

9. The apparatus of claim 1 wherein said computer processing component is configured with software to automatically terminate power to said fabrication laser beam when a predefined cutting and ablation deformation value is reached.

10. The apparatus of claim 1, wherein said fabrication chamber further contains an alignment laser capable of emitting an alignment laser beam.

11. The apparatus of claim 9, wherein said fabrication chamber further contains a beam combiner which combines said fabrication and alignment laser beams into a single beam.

12. The apparatus of claim 1, wherein said glass preform is a solid cylinder having a diameter ranging from about 0.5 mm to about 10 mm.

13. The apparatus of claim 1, wherein said glass preform is a hollow cylinder having a diameter ranging from about 0.5 mm to about 10 mm.

14. The apparatus of claim 1, wherein said glass preform is composed of the materials selected from the group consisting of: fused silica, fused quartz, erbium doped silica, ZBLAN, chalcogenide glasses, germanium oxide, or other glasses with high nonlinear coefficients and sufficient absorption at the wavelength of the laser.

15. The apparatus of claim 1, wherein said motorized rotating spindle is a ball bearing spindle having a runout value of less than about 20 microns.

16. The apparatus of claim 1, wherein said motorized rotating spindle is an air bearing spindle.

17. The apparatus of claim 1, wherein said motorized rotating spindle is operatively connected to a computer processing component configured with software for controlling a rotation motor of said motorized rotating spindle.

18. The apparatus of claim 14, wherein a rotation motor of said motorized rotating spindle is capable of rotating at a rate of from about 10 revolutions per minute to about 2000 revolutions per minute.

19. The apparatus of claim 1, wherein said translation stage is operatively connected to a translation motor and a computer processor programmed with software for controlling the translation motor.

20. The apparatus of claim 1, wherein said fabrication laser is a $CO_2$ laser.

21. The apparatus of claim 1, wherein said fabrication laser is a pulsed laser.

22. The apparatus of claim 1, wherein said fabrication laser is a type of laser other than $CO_2$ that operates at a wavelength with sufficient glass preform optical absorption.

23. A method for fabricating an optical microresonator having a whispering gallery mode, comprising the steps of:
   preselecting threshold input values for radius of curvature, thickness and diameter of a desired optical microresonator;
   mounting a glass preform to a motorized rotating spindle enclosed by a fabrication chamber, wherein said fabrication chamber is filled with an inert gas;
   rotating said glass preform at a specified rotational speed within said fabrication chamber;
   focusing a fabrication laser beam through a laser-focusing lens mounted to a translation stage within said fabrication chamber in order to align said glass preform with said fabrication laser beam; and
   moving said laser-focusing lens via said translation stage within said fabrication chamber to create a pattern of an optical microresonator having a whispering gallery mode on said glass preform; and
   continuously taking measurements of a shape of said glass preform with an imaging system while said glass preform is aligned with said laser beam within said fabrication chamber.

24. The method of claim 23 wherein said glass preform is preselected from a material having optical properties which correspond to desired wavelength ranges.

25. The method of claim 23 wherein said fabrication laser beam alters said glass preform by a process selected from a group consisting of cutting and ablation.

26. The method of claim 23 wherein a computer processing component receives said threshold input values for radius of curvature, thickness and diameter and performs adjustment of said laser beam by moving said focusing lens to produce an optical microresonator to correspond to said input values.

27. The method of claim 23 wherein a computer processing component receives said threshold input values for curvature, thickness and diameter and displays said values to facilitate manual positioning of said focusing lens to produce an optical microresonator to correspond to said input values.

28. A system for fabrication of an optical microresonator having a whispering gallery mode with controllable shape, comprised of:
   a fabrication chamber, wherein said fabrication chamber encloses an inert gas, a motorized rotating spindle, a preform of glass, a fabrication laser, a movable focusing lens and at least one computer processing component,
      wherein said preform of glass is mounted to said motorized rotating spindle;
      wherein said fabrication laser emits a fabrication laser beam having a first beam diameter $D_1$, a first horizontal position $X_1$ and a first vertical position $Y_1$, wherein said laser beam partly or fully impinges on said glass preform;
      wherein said movable focusing lens has a first focusing lens position $Pos_1$, wherein said movable focusing lens is movable along at least one axis perpendicular to said laser along a plurality of subsequent positions $Pos_n$ and wherein $D_1$, $X_1$ and $Y_1$ are altered proportionately to $D_n$, $X_n$, and $Y_n$, for each of said plurality of positions $Pos_n$; and
   a piezoelectric element, wherein said piezoelectric element is configured to be mechanically coupled to said optical microresonator.

29. The system of claim 28, wherein said piezoelectric element is a planar element configured to be mounted along a face of said microresonator in order to bend and compress said optical microresonator.

30. The system of claim 28, wherein said optical microresonator is a rod-shaped microresonator and said piezoelectric element is a ring-shaped element configured to be mounted around said rod in order to radially compress and extend said optical microresonator.

31. The system of claim 28, wherein said piezoelectric element enables frequency control of nonlinear parametric oscillation and four-wave mixing effects of said microresonator.

32. The system of claim 28, wherein said piezoelectric element enables control of nonlinear optical stimulated Brillouin scattering and Raman effects of said microresonator.

33. The system of claim 28, wherein said piezoelectric element enables wideband tuning of the frequency spacing between the output modes of a nonlinear-Kerr-effect optical frequency comb generated with said microresonator.

* * * * *